(12) United States Patent
Nakagawa et al.

(10) Patent No.: US 9,475,911 B2
(45) Date of Patent: Oct. 25, 2016

(54) POLYESTER COMPOSITION AND POLYESTER FILM

(71) Applicant: TOYOBO CO., LTD., Osaka (JP)

(72) Inventors: Satoru Nakagawa, Fukui (JP); Hideto Ohashi, Fukui (JP); Kunihiro Maeda, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 35 days.

(21) Appl. No.: 14/387,624

(22) PCT Filed: Mar. 21, 2013

(86) PCT No.: PCT/JP2013/058053
§ 371 (c)(1),
(2) Date: Sep. 24, 2014

(87) PCT Pub. No.: WO2013/146524
PCT Pub. Date: Oct. 3, 2013

(65) Prior Publication Data
US 2015/0087762 A1    Mar. 26, 2015

(30) Foreign Application Priority Data

Mar. 29, 2012 (JP) ................................ 2012-076608

(51) Int. Cl.
| | | |
|---|---|---|
| *C08K 3/22* | (2006.01) | |
| *C08J 5/18* | (2006.01) | |
| *C08G 63/84* | (2006.01) | |
| *C08G 63/87* | (2006.01) | |
| *C08K 5/5317* | (2006.01) | |
| *C08K 3/36* | (2006.01) | |

(52) U.S. Cl.
CPC .................. *C08J 5/18* (2013.01); *C08G 63/84* (2013.01); *C08G 63/87* (2013.01); *C08K 3/22* (2013.01); *C08K 5/5317* (2013.01); *C08J 2367/02* (2013.01); *C08K 3/36* (2013.01)

(58) Field of Classification Search
CPC ............ C08G 63/84; C08J 5/18; C08K 3/22; C08L 67/02
USPC .................................. 523/351; 524/493, 497
See application file for complete search history.

(56) References Cited

U.S. PATENT DOCUMENTS

| | | |
|---|---|---|
| 4,427,661 A | 1/1984 | Curley et al. |
| 5,705,601 A | 1/1998 | Ueda et al. |
| 2007/0149757 A1 | 6/2007 | Nakajima et al. |
| 2012/0183761 A1 | 7/2012 | Hamamoto et al. |

FOREIGN PATENT DOCUMENTS

| | | |
|---|---|---|
| JP | 59-46254 | 3/1984 |
| JP | 59-179555 | 10/1984 |
| JP | 63-30335 | 2/1988 |
| JP | 8-302031 | 11/1996 |
| JP | 2000-302854 | 10/2000 |
| JP | 2001-26639 | 1/2001 |
| JP | 2001-131276 | 5/2001 |
| JP | 2002-322259 | 11/2002 |
| JP | 2005-186555 | 7/2005 |
| JP | 2006-282800 | 10/2006 |
| WO | 02/22707 | 3/2002 |
| WO | 2007/012731 | 2/2007 |
| WO | 2007/035250 | 3/2007 |
| WO | 2007/035256 | 3/2007 |
| WO | 2011/040161 | 4/2011 |

OTHER PUBLICATIONS

International Search Report issued Jun. 18, 2013 in International (PCT) Application No. PCT/JP2013/058053.
Extended European Search Report issued Nov. 18, 2015 in corresponding European Patent Application No. 13768106.0.

*Primary Examiner* — Edward Cain
(74) *Attorney, Agent, or Firm* — Wenderoth, Lind & Ponack, L.L.P.

(57) ABSTRACT

The present invention is a polyester composition for a film, wherein the polyester composition comprises a masterbatch polyester composition including 1.0 to 2.0%, by mass of inorganic particles having an average particle diameter of 0.5 to 3.0 μm and having been prepared using a polycondensation catalyst containing, and an inorganic particle-free polyester resin in a mass ratio of 1:15 to 35; and wherein the polyester composition will cause little filter clogging and can provide a polyester film that is excellent in slipping properties, running properties and wear resistance and will suffer from little deterioration in quality due to defects or insoluble particles located on the film.

12 Claims, No Drawings

POLYESTER COMPOSITION AND POLYESTER FILM

TECHNICAL FIELD

The present invention relates to a polyester composition containing inorganic particles and a polyester film obtained using the same and more particularly relates to a masterbatch polyester composition having been polymerized using an aluminum-based polycondensation catalyst and a polyester film containing the same as a main constituent component.

BACKGROUND ART

Polyesters represented by polyethylene terephthalate (PET), polybutylene terephthalate (PBT), and polyethylene naphthalate (PEN) and the like are excellent in mechanical properties and chemical properties and have been used in a wide range of fields, for example, as fibers for clothes and industrial materials; films and sheets for packaging and industrial applications; molded articles such as bottles and engineering plastics.

With respect to polyesters including an aromatic dicarboxylic acid and an alkylene glycol as main constitutional components as representative polyesters, for example in the case of a polyethylene terephthalate (PET), it has been produced industrially by, for example, a polycondensation method that includes performing esterification or transesterification of terephthalic acid or dimethyl terephthalate with ethylene glycol to produce bis(2-hydroxyethyl) terephthalate, and polycondensing this with a catalyst at a high temperature in vacuum.

As a polyester polymerization catalyst to be used in polycondensation of a polyester, technologies of using an alkali metal compound together with an aluminum compound have been disclosed (see, for example, Patent Documents 1, 2, 3, 4 and 5). The use of the above-mentioned polycondensation catalyst can polymerize a polyester having a sufficiently satisfactory degree of polymerization in a relatively good efficiency and therefore it can be an economically advantageous method. Patent Document 3 discloses a technology of improving color tone by adding a nitride, a boride, and a carbide of a specific transition metal element in addition to high catalytic activity of a polyester. Patent Document 4 discloses a technology of improving color tone by adding a phosphorus compound in addition to aluminum and an alkaline earth metal or an alkali metal. Patent Document 5 discloses a technology of improving color tone by adding a magnesium compound or a specific organic phosphorus compound in addition to aluminum and an alkali metal compound.

On the other hand, technologies of forming a polyester polycondensation catalyst having sufficient catalytic activity by adding a specific phosphorus compound to an aluminum compound are also publicly known (see, for example, Patent Documents 6 and 7). It has been reported that the use of the above-mentioned polyester polycondensation catalyst can afford a polyester excellent in heat stability.

Polyesters for films have some problems that when films are superimposed, the films are stuck to each other to cause so-called blocking, or in processing a rolled film, defects such as scratches are generated due to poor slipping property against a guide roll or the like. In order to solve such problems with handling of a film, a technology of including inert particles, such as inorganic particles, within a polyester has been used. Although the method of including inorganic particles or the like within a polyester includes a method of adding inorganic particles or the like at any stage in polyester polymerization and a method of including inorganic particles or the like in a previously produced polyester resin later by melt kneading, the addition in polymerization is preferred in terms of the dispersibility of inorganic particles. However, agglomeration of inorganic particles is an unavoidable problem even in the addition in polymerization. Therefore, various devices have been made to the properties of inorganic particles or the method of addition of particles in polymerization (see, for example, Patent Documents 8, 9 and 10). The above-cited patent documents have reported that as the best way for preventing agglomeration of inorganic particles, it is effective to apply surface treatment to the inorganic particles, further adding a polycondensation catalyst separately from the inorganic particles, and further adding the particles while dividing them in many portions.

The present inventors attempted to polymerize a polyester suitable for a film with little coarse particles derived from agglomeration of inorganic particles by using the technologies of polymerizing a polyester containing inorganic particles to be used for a film described in the above-cited Patent Documents 8, 9 and 10 and the polymerization catalyst technologies disclosed in the above-cited Patent Documents 1, 2, 6 and 7. As a result, a certain improving effect has been attained for the existing problems, but they recognized that it was insufficient for obtaining a further high value-added film. Specifically, it was found that when polymerizing a polyester using a polymerization catalyst made of an aluminum compound, polymerization with addition of inorganic particles in a prescribed amount necessary for imparting slipping property to a film resulted in agglomeration of the inorganic particles and defects that could not be disregarded as a high quality film were generated. In addition, it is recognized that deterioration in polymerization activity, deterioration in heat resistance, and change in color tone each caused by the addition of inorganic particles were problems that could not be disregarded.

In addition, the use of substances other than heavy metals such as antimony compounds, germanium compounds, or tin compounds, are desired as a polycondensation catalyst for a polyester from consideration for the environment. A titanium compound has been proposed as a substitute for such heavy metal-based polycondensation catalyst. However, a polyester produced using this is problematic in that the polyester is prone to thermal degradation in melt molding and the polyester is colored remarkably.

According to the above circumstances, there is a demand for a polyester composition using a polyester polycondensation catalyst including a metal component other than antimony compounds, germanium compounds, titanium compounds, and tin compounds, as a main component, the polyester composition being excellent in polymerization activity, causing little coloration or deterioration in heat resistance when inorganic particles are included therein, causing little generation of coarse particles due to agglomeration of inorganic particles, and being suitable for a high quality film application.

CITATION LIST

Patent Document

PTD 1: Japanese Patent Laying-Open No. 2000-302854
PTD 2: Japanese Patent Laying-Open No. 2001-26639
PTD 3: International Publication No. 07/035250 Pamphlet
PTD 4: International Publication No. 07/035256 Pamphlet PTD 5: International Publication No. 07/012731 Pamphlet
PTD 6: International Publication No. 02/022707
PTD 7: Japanese Patent Laying-Open No. 2001-131276
PTD 8: Japanese Patent Publication No. 59-46254
PTD 9: Japanese Patent Laying-Open No. 59-179555
PTD 10: Japanese Patent Publication No. 63-30335

SUMMARY OF INVENTION

Technical Problem

It is an object of the present invention to provide a polyester composition having sufficient degree of polymerization and heat stability and being inhibited from agglomeration of inorganic particles, having been produced using a polyester polycondensation catalyst failing to contain polycondensation catalysts such as antimony compounds and germanium compounds as main components wherein when used for a polyester film or the like, little filter clogging is caused and can provide a polyester film that is excellent in a slipping property, a running property and wear resistance and will suffer from little deterioration in quality due to defects or insoluble particles located on the film.

Solution to Problem

As a result of earnest investigations, the present inventors found that the problems can be solved by the means shown below and have accomplished the present invention.

Accordingly, the present invention provides the following constitutions.

(1) A polyester composition for a film, wherein the polyester composition comprises a masterbatch polyester composition including 1.0 to 2.0% by mass of inorganic particles having an average particle diameter of 0.5 to 3.0 μm and being prepared using an aluminum compound and a phosphorus compound, and an inorganic particle-free polyester resin in a mass ratio of 1:15 to 35.

(2) The polyester composition for a film according to (1), wherein the phosphorus compound has phenolic moieties in the same molecule thereof.

(3) The polyester composition for a film according to (1) or (2), wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

(4) A masterbatch polyester composition to be used for the polyester composition for a film according to (1), wherein the masterbatch polyester composition comprises 1.0 to 2.0% by mass of inorganic particles having an average particle diameter of 0.5 to 3.0 μm and is prepared using an aluminum compound and a phosphorus compound.

(5) The masterbatch polyester composition according to (4), wherein the phosphorus compound has phenolic moieties in the same molecule thereof.

(6) The masterbatch polyester composition according to (4) or (5), wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

(7) A polyester film produced using the polyester composition for a film according to any one of (1) to (3).

Advantageous Effects of Invention

The masterbatch polyester composition of the present invention contains components other than antimony compounds or germanium compounds as main components and is produced using an aluminum compound excellent in catalytic activity and the dispersibility of inorganic particles added during the production thereof is good. Therefore, a film using the masterbatch polyester composition of the present invention is excellent in running property, wear resistance, optical properties, and the like, and can be used for a wide variety of applications, such as packaging films and industrial films.

DESCRIPTION OF EMBODIMENTS

[Masterbatch Polyester Composition]

Into the masterbatch polyester composition of the present invention have been added inert inorganic particles during a polymerization step of forming the masterbatch polyester in order to form irregularities on a surface during film production and thereby improving handling properties such as slipping properties, running properties, wear resistance, and winding properties. Generally, examples of a technology of forming irregularities on the surface of a polyester film include an external particle addition method of adding inorganic and/or heat-resistant polymer resin particles in a step of polymerization of a polyester, an internal particle method of reacting a catalyst residue with constituent components of a polyester in a polymerization step, thereby precipitating particles which are insoluble, a method of including the above-mentioned particles in a coating layer, a method of emboss processing the surface of a thin film layer with a roll provided with irregularities, and a method of patterning surface irregularities with a laser beam or the like. In respect of production efficiency or stability of quality, a method of adding inert particles during a polyester polymerization step like the present invention is most preferred.

As the inert particles to be added to the masterbatch polyester according to the present invention, the inorganic particles provided below as examples are preferable in that they can demonstrate effectively a below-described effect of preventing agglomeration of inert particles.

The polycondensation catalyst to be used when polymerizing the masterbatch polyester composition of the present invention is a catalyst containing an aluminum compound and a phosphorus compound.

Explanations are made below to the aluminum compound, the phosphorus compound and the inorganic particles according to the present invention, and an explanation is made to a mode of the best polymerization method.

Publicly known aluminum compounds can be used as the aluminum compound according to the present invention.

Specific examples of the aluminum compound according to the present invention include carboxylates such as aluminum formate, aluminum acetate, basic aluminum acetate, aluminum propionate, and aluminum oxalate, inorganic acid salts such as aluminum chloride, aluminum hydroxide, and aluminum hydroxychloride, aluminum alkoxides such as an aluminum methoxide, aluminum ethoxide, aluminum isopropoxide, aluminum n-butoxide, and aluminum tert-butoxide, aluminum chelate compounds such as aluminum acetylacetonate and aluminum ethylacetoacetate, organoaluminum compounds such as trimethylaluminum and triethylaluminum and partial hydrolysates thereof, and aluminum oxide. Among these compounds, carboxylic acid salts, inorganic acid salts, and chelating compounds are preferable and further, aluminum acetate, basic aluminum acetate, aluminum chloride, aluminum hydroxide, aluminum hydroxychloride, and aluminum acetylacetonate are particularly preferable.

The addition amount of the aluminum compound is preferably 0.001 to 0.05% by mole, more preferably 0.005 to 0.043% by mole, and even more preferably 0.005 to 0.036% by mole relative to the number of moles of all of the constituent units of carboxylic acid components, such as a dicarboxylic acid and a polycarboxylic acid, of the polyester to be obtained. If the addition amount is less than 0.001% by mole, catalytic activity sometimes cannot be exhibited sufficiently and if the addition amount exceeds 0.05% by mole, deterioration in heat stability and thermooxidation stability as well as generation of insoluble particles and increase in coloration attributed to aluminum may become problems in some cases. As described above, the present inventions are particularly characterized in that even if the addition amount of an aluminum component is low, the polymerization catalyst of the present inventions shows sufficient catalytic activity. As a result, heat stability and thermooxidation stability are excellent and insoluble particles and coloration attributed to aluminum can be reduced.

Although the phosphorus compound according to the present invention is not particularly restricted, the use of a phosphonic acid based compound or a phosphinic acid based compound is preferred because a significant effect of improving catalytic activity is exhibited, and among these, the use of a phosphonic acid based compound is preferable because a particularly significant effect of improving catalytic activity is exhibited.

Among such phosphorus compounds, phosphorus compounds having phenolic moieties in the same molecule are preferred. Although any phosphorus compounds having a phenol structure are available without any particular limitations, the use of one or two or more compounds selected from the group consisting of phosphonic acid based compounds and phosphinic acid based compounds, each of which has phenolic moieties in the same molecule, is preferable because a significant effect of improving catalytic activity is exhibited. Among these, the use of one or two or more phosphonic acid based compounds each having phenolic moieties in the same molecule is preferable because a particularly significant effect of improving catalytic activity is exhibited.

Examples of the phosphorus compound having phenolic moieties in the same molecule include compounds represented by the following formula (1) or (2).

[Chemical Formula 1]

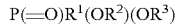

P(=O)R$^1$(OR$^2$)(OR$^3$)  Formula (1)

[Chemical Formula 2]

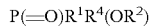

P(=O)R$^1$R$^4$(OR$^2$)  Formula (2)

(In formulae (1) to (2), R$^1$ denotes a hydrocarbon group having 1 to 50 carbon atoms and containing phenolic moieties, or a hydrocarbon group having 1 to 50 carbon atoms and containing a substituent, such as a hydroxyl group, a halogen group, an alkoxyl group, or an amino group, as well as phenolic moieties. R$^4$ denotes hydrogen, a hydrocarbon group having 1 to 50 carbon atoms, or a hydrocarbon group having 1 to 50 carbon atoms and containing a substituent such as a hydroxyl group, a halogen group, an alkoxyl group, or an amino group. R$^2$ and R$^3$ each independently denote hydrogen, a hydrocarbon group having 1 to 50 carbon atoms, or a hydrocarbon group having 1 to 50 carbon atoms and containing a substituent such as a hydroxyl group or an alkoxyl group. The hydrocarbon group may include branched structure, alicyclic structure such as cyclohexyl, and aromatic ring structure such as phenyl and naphthyl. Terminals of R$^2$ and R$^4$ may be bonded to each other.)

Examples of the phosphorus compound having phenolic moieties within the same molecule include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenylphosphinic acid, methyl p-hydroxyphenylphenylphosphinate, phenyl p-hydroxyphenylphenylphosphinate, p-hydroxyphenylphosphinic acid, methyl p-hydroxyphenylphosphinate, and phenyl p-hydroxyphenylphosphinate. Additional examples include phosphorus compounds represented by the following formula (3).

[Chemical Formula 3]

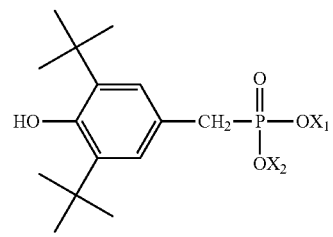

Formula (3)

In Formula (3), X$_1$ and X$_2$ each represent hydrogen, an alkyl group having 1 to 4 carbon atoms, or a mono- or more valent metal.

It is also permitted that X$_1$ is di- or more valent and there is no X$_2$. Moreover, it is also permitted that anions corresponding to the excess valence of a metal relative to the phosphorus compound may be arranged.

Preferred as the metal are Li, Na, K, Ca, Mg, and Al.

By adding such a phosphorus compound having phenolic moieties in the same molecule at the time of polymerization of a polyester, the catalytic activity of an aluminum compound is improved and the heat stability of the polymerized polyester is also improved.

Among those described above, a phosphorus compound preferable to be used as a polycondensation catalyst is at least one phosphorus compound selected from compounds represented by chemical formula (4) or chemical formula (5).

[Chemical Formula 4]

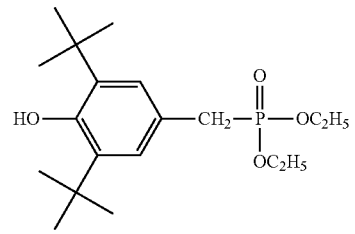

Formula (4)

[Chemical Formula 5]

Formula (5)

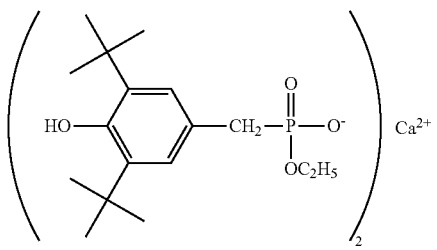

Irganox 1222 (manufactured by BASF Japan Ltd.) is marketed as a compound represented by the above chemical formula (4). Irganox 1425 (manufactured by BASF Japan Ltd.) is marketed as a compound represented by the above chemical formula (5).

The addition amount of the phosphorus compound is preferably 0.0001 to 0.10% by mole, more preferably 0.005 to 0.08% by mole, relative to the number of moles of all of the constituent units of the dicarboxylic acid components constituting the polyester. If the addition amount of the phosphorus compound is less than 0.0001% by mole, an addition effect may not be demonstrated. On the other hand, if the phosphorus compound is added in an amount exceeding 0.1% by mole, the catalytic activity as a polyester polymerization catalyst may deteriorate. The tendency of the deterioration varies depending upon the addition amount of aluminum, and the like.

By the use of the phosphorus compound having the above-described specific chemical structure can be obtained a polycondensation catalyst that fails to cause problems of deterioration in heat stability, generation of insoluble particles, and the like, and demonstrates a sufficient catalytic effect even at a small addition amount as aluminum of the metal-containing component. By the use of a polyester polymerized with this polycondensation catalyst, the heat stability of a polyester film after melt molding is improved.

Even if the above-described phosphorus compound is used in an addition amount within the above-described preferable range in combination with a conventional metal-containing polyester polycondensation catalyst such as an antimony compound, a titanium compound, a tin compound, or a germanium compound, an effect of promoting a melt polymerization reaction cannot be observed.

On the other hand, it is permitted in the present invention to use together a metal-containing polyester polycondensation catalyst, such as an antimony compound, a titanium compound, a tin compound, and a germanium compound, in order to further improve the catalytic activity as long as the effect of the present invention is not impaired. In this case, the antimony compound is preferably used in an amount of less than or equal to 30 ppm in terms of antimony atoms relative to the mass of the resulting polyester. The germanium compound is preferably used in an amount of less than or equal to 10 ppm in terms of germanium atoms relative to the mass of the resulting polyester. The titanium compound is preferable used in an amount of less than or equal to 3 ppm in terms of titanium atoms relative to the mass of the resulting polyester. The tin compound is preferable used in an amount of less than or equal to 3 ppm in terms of tin atoms relative to the mass of the resulting polyester. In view of the object of the present invention, it is preferable to use no metal-containing polyester polycondensation catalysts such as an antimony compounds, a titanium compound, a tin compound, and a germanium compound.

On the other hand, it is permitted in the present invention to allow a small amount of at least one compound selected from alkali metals, alkaline earth metals and compounds thereof to coexist as a second metal-containing component in addition to the aluminum compound. Coexistence of the second metal-containing component is effective to enhance catalytic activity in addition to effect of suppressing formation of diethylene glycol and accordingly a catalyst component with high reaction speed is obtained and it is effective to improve the productivity.

When an alkali metal compound has been used, the amount of insoluble particles resulting therefrom increases, so that there is a tendency that the frequency in which a filter is changed in a melt-extrusion step in film production increases or film defects increase.

In the case an alkaline earth compound has been used, an attempt to obtain practically applicable catalytic activity will lead to deterioration in the heat stability and thermooxidation stability of the resulting polyester, considerable coloration by heating, increase in the amount of insoluble particles generated.

Accordingly, when adding an alkali metal, an alkaline earth metal, or a compound thereof in combination, the addition amount thereof M (% by mole) is preferably $1 \times 10^{-5}$ to 0.01% by mole relative to the number of moles of all polycarboxylic acid units constituting the polyester.

In the present invention, since the addition amount of an alkali metal or an alkaline earth metal is small even if added in combination, it is possible to increase a reaction rate without causing problems such as deterioration in heat stability, generation of insoluble particles, and coloration. Moreover, no problems such as deterioration in resistance to hydrolysis will be caused.

The alkali metal and the alkaline earth metal constituting the second metal-containing component to be preferably used in addition to aluminum or its compound are preferably at least one selected from among Li, Na, K, Rb, Cs, Be, Mg, Ca, Sr, and Ba and it is more preferable to use an alkali metal or its compound.

When an alkali metal or its compound is used, especially Li, Na, and K are preferable. Examples of compounds of alkali metals and alkaline earth metals may include metal salts of acid, alkoxides such as methoxide, ethoxide, n-propoxide, iso-propoxide, n-butoxide, and tert-butoxide, chelate compounds such as acetylacetonate, and hydrides, oxides, and hydroxides. Acid which comprise metal salts of acid include; saturated aliphatic carboxylic acid such as formic acid, acetic acid, propionic acid, butyric acid, and oxalic acid; unsaturated aliphatic carboxylic acid such as acrylic acid and methacrylic acid; aromatic carboxylic acid such as benzoic acid; halogen-containing carboxylic acid such as trichloroacetic acid; hydroxycarboxylic acid such as lactic acid, citric acid, and salicylic acid; inorganic acid such as carbonic acid, sulfuric acid, nitric acid, phosphoric acid, phosphonic acid, hydrogen carbonate, hydrogen phosphate, hydrogen sulfide, sulfurous acid, thiosulfuric acid, hydrochloric acid, hydrobromic acid, chloric acid, and bromic acid; organic sultbnic acid such as 1-propanesulfonic acid, 1-pentanesulfonic acid, and naphthalenesulfonic acid; organic sulfuric acid such as laurylsulfuric acid.

Among such alkali metals, alkaline earth metals, and compounds thereof, the use of saturated aliphatic carboxylic acid salts of the alkali metals or alkaline earth metals, particularly acetic acid salts is preferable in terms of handling easiness and easy availability.

The production of the polyester according to the present invention can be carried out by a conventionally known method. For example, it can be carried out by either a method of performing esterification of terephthalic acid with ethylene glycol and then performing polycondensation or a method of performing a transesterification reaction of an alkyl ester of terephthalic acid, such as dimethyl terephthalate, with ethylene glycol and then performing polycondensation. The polymerization apparatus may be either of a batch type or of a continuous type.

The catalyst according to the present inventions has catalytic activity not only on a polycondensation reaction but also on an esterification reaction and a transesterification reaction. Although a transesterification reaction between an alkyl ester of a dicarboxylic acid, such as dimethyl terephthalate, and a glycol, such as ethylene glycol, is usually performed in the presence of a transesterification catalyst, such as zinc, the catalyst of the present invention can also be used instead of those catalysts. The catalyst of the present invention has catalytic activity not only in melt polymerization but also solid phase polymerization and solution polymerization.

The polyester polymerization catalyst to be used in the present invention can be added to a reaction system at any stage of the polymerization reaction. For example, it can be added to a reaction system at any stage before the start of the esterification reaction or the transesterification reaction and during the reactions, just before the start of the polycondensation reaction, or at any stage during the polycondensation reaction. Particularly, it is preferable to add the aluminum compound and the phosphorus compound to be used in the present invention just before the start of the polycondensation reaction.

The polyester according to the present invention refers to a product composed of one or two or more species selected from among polycarboxylic acids including dicarboxylic acids and their ester-formable derivatives and one or two or more species selected from among polyhydric alcohols including glycol; a product composed of hydroxycarboxylic acids and their ester-formable derivatives; or a product composed of cyclic esters.

A preferable polyester is a polyester in which the main acid component is terephthalic acid, its ester-formable derivative, naphthalene dicarboxylic acid, or its ester-formable derivative and the main glycol component is an alkylene glycol.

The polyester in which the main acid component is terephthalic acid, its ester-formable derivative, naphthalene dicarboxylic acid, or its ester-formable derivative is preferably a polyester containing terephthalic acid or its ester-formable derivative and naphthalene dicarboxylic acid or its ester-formable derivative in an amount of greater than or equal to 70% by mole, more preferably greater than or equal to 80% by mole, and even more preferably greater than or equal to 90% by mole, in total relative to all of the acid components.

The polyester in which the main glycol component is an alkylene glycol is preferably a polyester containing an alkylene glycol in an amount of greater than or equal to 70% by mole, more preferably greater than or equal to 80% by mole, and even more preferably greater than or equal to 90% by mole, in total relative to all of the glycol components.

Examples of the dicarboxylic acid include saturated aliphatic dicarboxylic acids exemplified by oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid and dimer acid, or their ester-formable derivatives, unsaturated aliphatic dicarboxylic acids exemplified by fumaric acid, maleic acid and itaconic acid, or their ester-formable derivatives, and aromatic dicarboxylic acid exemplified by orthophthalic acid, isophthalic acid, terephthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid, or their ester-formable derivatives.

Among these dicarboxylic acids, terephthalic acid, naphthalene dicarboxylic acid, or their ester-formable derivatives are preferred.

Examples of the naphthalene dicarboxylic acid or its ester-formable derivative include 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, or their ester-formable derivatives.

Terephthalic acid, 2,6-naphthalenedicarboxylic acid, or their ester-formable derivatives are particularly preferable. Other dicarboxylic acids may be used as constituent components as necessary.

Examples of polycarboxylic acids other than these dicarboxylic acids may include ethanetricarboxylic acid, propanetricarboxylic acid, butanetetracarboxylic acid, pyromellitic acid, trimellitic acid, trimesic acid, 3,4,3',4'-biphenyltetracarboxylic acid, and their ester-formable derivatives.

Examples of the glycol include aliphatic glycols exemplified by alkylene glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol and 1,12-dodecanediol, polyethylene glycol, polytrimethylene glycol, and polytetramethylene glycol; and aromatic glycols exemplified by hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to those glycols.

Among these glycols, alkylene glycols are preferable, and ethylene glycol, 1,3-propylene glycol, 1,4-butylene glycol, and 1,4-cyclohexanedimethanol are more preferable. The aforementioned alkylene glycols may include a substituent and an alicyclic structure in their molecular chains and two or more species thereof may be used simultaneously.

Examples of polyhydric alcohols other than these glycols are trimethylolmethane, trimethylolethane, trimethylolpropane, pentaerythritol, glycerol, and hexanetriol.

Examples of hydroxycarboxylic acids may include lactic acid, citric acid, malic acid, tartaric acid, hydroxyacetic acid, 3-hydroxybutyric acid, p-hydroxybenzoic acid, p-(2-hydroxyethoxyl)benzoic acid, 4-hydroxycyclohexanecarboxylic acid and their ester-formable derivatives.

Examples of the cyclic esters may include ε-caprolactone, β-propiolactone, β-methyl-β-propiolactone, γ-valerolactone, glycollide, and lactide.

Examples of the ester-formable derivatives of the polycarboxylic acids and hydroxycarboxylic acids are their alkyl esters and acid chlorides, and acid anhydrides.

Polyesters to be used in the present invention are preferably polyethylene terephthalate, polybutylene terephthalate, polypropylene terephthalate, poly(1,4-cyclohexanedimethylene terephthalate), polyethylene naphthalate, polybutylene naphthalate, polypropylene naphthalate, and their copolymers, and among them, polyethylene terephthalate and its copolymers are particularly preferable.

The intrinsic viscosity of the masterbatch polyester composition to be used in the present invention is preferably 0.4 to 1.0 dl/g, and more preferably 0.5 to 0.75 dl/g. In the present invention, since intrinsic viscosity is measured using a polyester composition containing inorganic particles, the intrinsic viscosity of a polyester composition is indicated.

The inorganic particles to be added to a masterbatch polyester in the present invention preferably has an average particle diameter of 0.5 to 3.0 μm, more preferably 0.8 to 2.5 μm, and even more preferably 2.0 to 2.5 μm. The case that the average particle diameter is less than 0.5 μm is undesirable because an effect of imparting handling properties such as a slipping property and a running property by forming irregularities on a surface will be reduced. On the other hand, the case that the average particle diameter exceeds 3.0 μm is undesirable because the quality of a film may be impaired by formation of coarse projections.

The average particle diameter as used herein is one determined from particle size distribution measured by a laser light scattering method using water or ethylene glycol as a medium.

In the present invention, the addition amount of the inorganic particles to the masterbatch polyester is within the range of 1.0 to 2.0% by mass. The addition amount of the inorganic particles to the masterbatch polyester is preferably within the range of 1.2 to 1.8% by mass. The case that the addition amount is less than 1.0% by mass is undesirable because formation of coarse particles due to agglomeration of inorganic particles after blend dilution will increase. The case that the addition amount exceeds 2.0% by mass is undesirable because an effect of preventing coarse particles is insufficient and generation of insoluble particles when producing a film will become a problem.

Particles made of an oxide, a carbonate, a silicate, a sulfate, or an aluminate of metal such as titanium, aluminum, silicon, calcium, magnesium, and barium can be used as the inorganic particles to be used in the present invention.

Specific examples include, but are not limited to, particles of titanium dioxide, alumina, aluminosilicate, silicon dioxide, calcium oxide, calcium carbonate, barium sulfate, and the like as well as naturally occurring talc, mica, kaolinite, and zeolite.

More preferably, in order to prevent agglomeration, such inorganic particles are slurried with a glycol, then improved in dispersion efficiency by mechanical dispersion with a medium agitation type dispersion device such as a sand grinder, an attritor and supersonic waves and addition of an alkali metal compound, an ammonium compound and a phosphorus compound, and then added. The timing of addition of the inorganic particles is not particularly limited.

In the masterbatch polyester composition of the present invention, one or two or more additives such as inert particles such as heat-resistant polymer particles and cross-linked polymer particles, a fluorescent whitener, an ultraviolet inhibitor, an infrared absorbing dye, a heat stabilizer, a surfactant and an antioxidant may be included in addition to the inorganic particles depending on the purpose of use. Examples usable as the antioxidant include aromatic amine antioxidants and phenol antioxidants and examples usable as the stabilizer include phosphorus-containing stabilizers such as phosphoric acid and phosphoric acid esters, sulfur-containing stabilizers, and amine stabilizers.

Such additives other than the inorganic particles may be added into the masterbatch polyester composition preferably in a proportion of less than or equal to 10% by mass in total, more preferably in a proportion of less than or equal to 5% by mass. In other words, the polyester and the inorganic particle preferably occupy greater than or equal to 90% by mass, more preferably greater than or equal to 95% by mass in total of the masterbatch polyester composition of the present invention.

[Polyester Resin Free of Inorganic Particles]

The polyester of the above-described masterbatch polyester composition can be used as it is except containing no inorganic particles for the polyester resin free of inorganic particles according to the present invention.

Although the polycondensation catalyst is not limited to the above-described polycondensation catalyst containing an aluminum compound and a phosphorus compound, the above-described polycondensation catalyst to be used for the masterbatch polyester composition is preferable from consideration for the environment.

The intrinsic viscosity of the polyester resin is preferably 0.4 to 1.0 dl/g, more preferably 0.5 to 0.75 dl/g.

[Polyester Composition for Film]

The polyester composition for a film of the present invention is a product prepared by mixing the above-described masterbatch polyester composition and the above-described polyester resin free of inorganic particles in a mass ratio of 1:15 to 35. In other words, that is a product prepared by diluting the masterbatch polyester composition with 15 to 35-fold mass of the polyester resin free of inorganic particles. The mass ratio of the masterbatch polyester composition to the polyester resin free of inorganic particles is preferably 1:18 to 32.

The method for measuring the number of coarse particles formed by agglomeration of the inorganic particles in the polyester composition for a film of the present invention is described below.

Measurement of the number of coarse particles in the polyester composition for a film of the present invention uses a method of measuring the size and the number of particles by image analysis from an image of particles in a polymer observed using a phase contrast light microscope. Since a phase contrast light microscope can convert a slight delay (phase contrast) of the wavelength of light that penetrates objects differing in index of refraction differ into black and white contrast using diffraction and refraction of light, the phase contrast light microscope is suitable for observation of inorganic particles which look colorless and transparent in a polymer by usual microscopic observation. An observed image is captured as electronic data into an image analyzer, and a particle diameter (area equivalent-circle diameter) and the number of particles can be measured.

In observation of coarse particles with a phase contrast microscope, since the visual field area and the depth of focus are determined depending upon the magnification and the aperture of a lens to be used, variation in these factors will lead to generation of a gap between measured results. In some cases of a sample in which the content of inorganic particles is high and the light transmission is low, the resulting image is dark and sufficient observation cannot be performed with a high magnification lens. The thickness of a sample to be observed needs to be sufficiently large relative to the depth of focus of an object lens. In order to fulfill these conditions, observation is performed in the present invention by using a phase contrast objective lens of a phase contrast microscope with a magnification of 10 and an aperture of 0.5.

Measurement with an image analyzer is performed in the following procedures.

(1) An image obtained is converted into electronic signals. The converted image data is a monochrome image and the contrast of the image is constituted of 256 gradations of from 0 (deep-black) to 255 (pure white).

(2) Binarization processing to clearly define a boundary line between the object of the image (i.e., the coarse inorganic particles) and the background (i.e., the polymer) is performed to obtain a binarized image in which particles are black and the background is white.

(3) From the number of dots constituting the image, the diameter (area equivalent-circle diameter) and the number of particles are calculated.

The results obtained are data determined by reducing to a unit area depending upon the reduced scale of the actual image and dividing the number of particles for every particle diameter.

Measurement is performed usually at 20 to 40 visual fields and the measured results are used by calculating per 1 mm$^2$ of a visual field area.

In the observation and the measurement, it is preferred to appropriately adjust the shade and the resolution of an image with a standard sample whose particle diameter and number of particles are known and the threshold to be used in the binarization.

It is an important factor for the polyester composition for a film of the present invention that when a masterbatch polyester composition and a polyester resin free of inorganic particles are mixed so that the content of inorganic particles may be 0.06% by mass and then melt extruded to form chips, the number of coarse particles greater than or equal to 10 μm measured by the above-described method is greater than or equal to 100 per 1 mm$^2$. If the number of coarse particles exceeds 100, they become insoluble particles on the surface of a film to impair the appearance or quality of the film and, in addition, the back pressure of a filter increases or a filter is clogged in a melting step in producing a polymer or a film, so than a long-term stable production cannot be attained.

In order to impart sufficient slipping property and processing handling property to a film and allow the film to have good appearance or quality and satisfy stable productivity, the number of coarse particles of the polyester composition for a film of the present invention is preferably 10 to 100 particles/mm$^2$.

Since an aluminum compound has an effect of agglomerating inorganic particles, if the content of inorganic particles in a polyester increases, agglomerated insoluble particles will increase and the number of coarse particles will increase. If a phosphorus compound is added hereto, the aluminum compound interacts with the phosphorus compound to increase the affinity between molecular chains of a polyester intermediate reaction product and the inorganic particles, so that agglomeration of the inorganic particles becomes less likely to occur.

If the concentration of the inorganic particles is made higher, the effect of improving the affinity between the molecular chains of the polyester intermediate reaction product and the inorganic particles is enhanced and, as a result, agglomerated insoluble particles in a polyester can be reduced and the number of coarse particles can be reduced. By mixing and diluting the masterbatch polyester composition with a polyester resin free of inorganic particles, the number of coarse particles can be further reduced.

Then, the present invention has been accomplished by finding the fact that producing beforehand a masterbatch polyester composition containing inorganic particles in a high concentration and mixing it with a polyester resin free of inorganic particles have an effect of reducing agglomerated insoluble inorganic particles which will become defects when forming a film.

Next, an example of the method for producing a film using the polyester composition for a film of the present invention is described below. The method for producing a polyester film is not limited to the following. The above-described polyester composition for a film is melt extruded and shaped into a sheet-like form on a cooling rotating roll through a T-die to produce an undrawn sheet. In this case, the technology disclosed in Japanese Patent Application Publication (JP-B) Nos. 6-39521 and 6-45175 may be employed to make high speed film formation possible. Further, a laminate film may be formed by a co-extrusion method by using a plurality of extruders while allotting various functions to a core layer and a skin layer.

An oriented polyester film can be obtained by drawing a polyester at a temperature equal to or higher than the glass transition temperature and lower than the crystallization temperature, to 1.1 to 6 times in at least uniaxial direction by employing a conventional method.

For example, in the case of producing a biaxially oriented polyester film, the following methods can be employed: that is, a successive biaxial drawing method for carrying out uniaxial drawing in the vertical or transverse direction and successive drawing in the rectangular direction; a simultaneous biaxial drawing method for carrying out drawing simultaneously in the vertical and the transverse directions; a method of using a linear motor as a driving method at the time of carrying out simultaneous biaxial drawing; and a multi-step drawing method involving drawing several times in one direction such as a transverse-vertical-vertical drawing method, a vertical-transverse-vertical drawing method, and a vertical-vertical-transverse drawing method.

On completion of the drawing, to suppress thermal shrinkage ratio of the film, it is preferable to carry out heat fixation treatment at a temperature from (melting point −50° C.) to lower than the melting point for 30 seconds, more preferable for 10 seconds, for 0.5 to 10% vertical relieving treatment and transverse relieving treatment.

The thickness of the resulting oriented polyester film is preferably 1 to 1000 μm, more preferably 5 to 500 μm, and even more preferably 10 to 200 μm. If it is thinner than 1 μm, the film is a lack of rigidity and difficult to handle. If it is thicker than 1000 μm, the film becomes so hard to make handling difficult.

To provide various kinds of functions such as adhesion, die-releasing property, anti-electrostatic property, infrared ray absorption, anti-bacterial property, and scratching resistance, the surface of the oriented polyester film may be coated with a polymer resin by a coating method. Further, a slippery highly transparent polyester film may be formed by including inorganic and/or organic particles only in the coating layer.

Further, various barrier functions against oxygen, water, and oligomers may be imparted by forming an inorganic vapor deposition layer or conductivity may be imparted by forming a conductive layer by a sputtering method or the like.

EXAMPLES

The present invention is described more with reference to examples below, but the invention is not limited to the examples. The evaluation methods used in Examples and Comparative Examples are described below.

In spite of a simple expression "polyester" in the following description, actual materials are "polyester compositions" each containing a catalyst component and inorganic particles.

[Evaluation Method]

(1) Intrinsic viscosity (IV) of polyester

A polyester was dissolved using a 6/4 (weight ratio) mixed solvent of phenol/1,1,2,2-tetrachloroethane and was measured at a temperature of 30° C.

(2) Average particle diameter of inorganic particles

Using a particle size distribution analyzer of a laser light scattering system (manufactured by Leeds & Northrup, Microtrac HRA model 9320-X100), a slurry of inorganic particles in ethylene glycol was diluted with water and measurement was carried out substantially in an aqueous system. The 50% volume cumulative diameter of the measurements was taken as an average particle diameter.

(3) The number of coarse particles in polyester (Method for measuring coarse particles of IMA)

Chips of a polyester composition for a film composed of a masterbatch polyester composition and a polyester resin free of inorganic particles were prepared. One of the chips was sandwiched between two cover glasses (MATSUNAMI Microcover glass, 25 mm×25 mm, 0.2 mm in thickness), heated and melted on a hot plate at about 300° C., pressed into a thickness of 0.8 to 0.9 mm, and then immediately cooled rapidly to form a sample for observation. Using a phase contrast microscope (manufactured by Nikon Corporation) and an object lens (manufactured by Nikon Corporation, magnification of 10, aperture of 0.5), the center part in the thickness of the sample was observed. An image was captured into an image analyzer (manufactured by Nireco Corporation, Luzex-FS) via a CCD camera and analyzed to measure the number of particles greater than or equal to 10 μm. The same measurement was conducted 20 times while varying the visual field and the total number of particles was determined. Then, the number of particles greater than or equal to 10 μm per 1 mm$^2$ of visual field area was calculated, and the calculated number was taken as the number of coarse particles.

(4) Judgment of polyester coloration

The color difference (L, a, b) of a polyester chip was measured using a color difference meter (manufactured by NIPPON DENSHOKU INDUSTRIES Co., Ltd., ZE-2000). The color difference of a polyester free of inorganic particles as a comparative resin was measured, and then a difference (Δb) between the b values was calculated.

(5) Judgment of insoluble particles of film

A sheet cut into 200 mm×300 mm from a film was irradiated with fluorescent lamp light from the rear side and the number of bright points visually observed was measured as the number of insoluble particles. The total number of insoluble particles of 10 sheets was calculated and judgment was made on the basis of the following criteria.

○: The number of insoluble particles is less than or equal to 100

Δ: The numbers of insoluble particles is 101 to 500 x: The number of insoluble particles is greater than or equal to 501

(6) Resistance to hydrolysis of film

As evaluation of resistance to hydrolysis, a Highly Accelerated temperature and humidity Stress Test (HAST) standardized by JIS-60068-2-66 was performed. The instrument used was EHS-221 manufactured by ESPEC CORP. The test was performed under conditions including 105° C., 100% RH, and 0.03 MPa.

A film was cut into 70 mm×190 mm and the cut films were installed using a jig. The respective films were installed at intervals long enough for preventing them from coming into contact with each other. Treatment was performed for 200 hours and 300 hours under conditions including 105° C., 100% RH, and 0.03 MPa. Elongations at break before and after the treatment was measured in accordance with JIS-C-2318-1997, 5.3.31 (Tensile Strength and Elongation Percentage) and an retaining rate of elongation at break was calculated according to the following formula.

Retaining rate of elongation at break (%)=[(Elongation at break after treatment (MPa))/(elongation at break before treatment (MPa))]×100

Judgment was made according to the following criteria.

○: Retention of elongation at break is greater than or equal to 80%

Δ: Retention of elongation at break is greater than or equal to 60% but less than 80% x: Retention of elongation at break is less than 60%

Example 1

(1) Preparation of Polycondensation Catalyst Solution (Preparation of aqueous solution of aluminum compound After 5.0 L of pure water was added to a flask equipped with condenser at room temperature and atmospheric pressure, stirring at 200 rpm, 200 g of basic aluminum acetate was added in form of slurry of pure water. Further, pure water was added to 1.5 adjust the total in 10.0 L and the solution was stirred at room temperature and atmospheric pressure for 12 hours. After that, the setting temperature of the jacket was changed to be 100.5° C. for heating and the mixture was stirred under refluxing for 3 hours from the moment the inner temperature exceeded 95° C. After that the stirring was stopped and immediately the solution was cooled to room temperature to obtain aqueous solution.

(Preparation of ethylene glycol mixed solution of aluminum compound)

After the aqueous aluminum compound solution obtained in the above-mentioned method was mixed with ethylene glycol in the same volume and stirred for 30 minutes at room temperature, the inner temperature was controlled at 80 to 90° C. and the pressure was gradually reduced to 2.7 kPa and while the resulting system was stirred for several hours, water was removed from the system to obtain ethylene glycol solution containing 20 g/l aluminum compound.

(Preparation of ethylene glycol solution of phosphorus compound)

After 2.0 L of ethylene glycol was added to a flask equipped with a nitrogen introduction tube and a refluxing tube at room temperature and atmospheric pressure, 200 g of Irganox 1222 (manufactured by BASF Japan Ltd.) as a phosphorus compound was added while being stirred at 200 rpm in a nitrogen atmosphere. Further, after 2.0 L of ethylene glycol was additionally added, setting of the jacket temperature was changed to be 196° C. for heating and after a moment the inner temperature reached 185° C. or higher, the mixture was stirred under refluxing for 60 minutes. After that the heating was stopped and immediately the solution was parted from the heat source and under keeping nitrogen atmosphere, the solution was cooled to 120° C. or lower in 30 minutes.

(2) Preparation of inorganic particle-containing ethylene glycol slurry

A dispersion vessel equipped with a homogenizer was charged with 5 L of ethylene glycol and 600 g of silica particles having an average particle diameter of 2.4 μm (manufactured by FUJI SILYSIA CHEMICAL LTD., Sylysia 310) as inorganic particles, which were stirred and dispersed at 8000 rpm for 2 hours to form a 120 g/l slurry.

(3) Method for producing masterbatch polyester composition

A stainless steel autoclave equipped with a stirrer, a distillation column, and a pressure regulator was charged with 2594 parts of terephthalic acid, 1938 parts of ethylene glycol, and the ethylene glycol slurry of silica particles prepared by the above-described method so that the amount of $SiO_2$ molecules might be 1.2% by mass relative to the mass of a resulting polyester composition, and further 11 parts of triethylamine was added. Then, the mixture was subjected to an esterification reaction for 2 hours while water formed by esterification was removed successively at 240° C. at a gauge pressure of 3.5 MPa.

Subsequently, the ethylene glycol solution of the aluminum compound and the ethylene glycol solution of the phosphorus compound both prepared by the above-described methods were added so that the amounts of aluminum atoms and phosphorus atoms might be 0.021% by mole and 0.037% by mole, respectively, relative to the acid component in the polyester. The temperature of the system was raised up to 280° C. over 1 hour and the pressure of the system was reduced slowly to 150 Pa during that period. Under this condition, a polycondensation reaction was carried out for 1 hour, so that a masterbatch polyester composition (A) was obtained. The intrinsic viscosity of the resulting masterbatch polyester composition (A) was 0.59 dl/g.

(4) Method for producing polyester resin free of inorganic particles

A stainless steel autoclave equipped with a stirrer, a distillation column, and a pressure regulator was charged with 2594 parts of terephthalic acid and 1938 parts of ethylene glycol, and further 11 parts of triethylamine was added. Then, the mixture was subjected to an esterification reaction for 2 hours while water formed by esterification was removed successively at 240° C. at a gauge pressure of 3.5 MPa.

Subsequently, the ethylene glycol solution of the aluminum compound and the ethylene glycol solution of the phosphorus compound both prepared by the above-described methods were added so that the amounts of aluminum atoms and phosphorus atoms might be 0.014% by mole and 0.025% by mole, respectively, relative to the acid component in the polyester. The temperature of the system was raised up to 280° C. over 1 hour and the pressure of the system was reduced slowly to 150 Pa during that period. Under this condition, a polycondensation reaction was carried out for 1 hour, so that a polyester (X) free of inorganic particles was obtained. The intrinsic viscosity of the resulting polyester resin (X) free of inorganic particles was 0.61 dl/g.

(5) Production of polyester film

Pellets of the masterbatch polyester composition produced above and pellets of the polyester resin (X) free of inorganic particles were mixed in a mass rate of 1:19, followed by vacuum drying at 135° C. for 10 hours. Subsequently, the mixture was metered and fed to a twin screw extruder, melt extruded into a sheet form at 280° C., and cooled rapidly and solidified on a metal roll whose surface temperature was kept at 20° C., so that a 1400-μm thick cast film was obtained.

Subsequently, the cast film was heated to 100° C. with a heated roll and an infrared heater and then drawn 3.5 times in the longitudinal direction with a group of rolls differing in peripheral speed to obtain a uniaxially oriented film. Then, the resulting film was drawn 4.0 times in the transverse direction at 120° C. with a tenter, heated at 260° C. for 0.5 seconds with an infrared heater while the film width was fixed, and further subjected to relaxation treatment of 3% at 200° C. for 23 seconds, so that a 100-μm thick biaxially oriented polyester film was obtained. The properties of the resulting film are given in Table 1.

Example 2

A masterbatch polyester composition (B) having an intrinsic viscosity of 0.58 dl/g was obtained in the same method as in Example 1 except that in the polymerization method of Example 1, the amount of the ethylene glycol slurry of silica particles was adjusted to 1.8% by mass in terms of $SiO_2$ molecules relative to the mass of the resulting polyester composition and the addition amounts of the aluminum compound and the phosphorus compounds were adjusted to 0.028% by moles and 0.050% by moles in terms of aluminum atoms and phosphorus atoms, respectively, relative to the acid component in the polyester. Next, a polyester film was obtained by producing a film by the same method as in Example 1 except that pellets of the resulting masterbatch polyester composition (B) and pellets of the polyester resin (X) free of inorganic particles were mixed together in a mass ratio of 1:29. The properties of the resulting film are given in Table 1.

Comparative Example 1

A masterbatch polyester composition (C) having an intrinsic viscosity of 0.58 dl/g was obtained in the same method as in Example 1 except that in the polymerization method of Example 1, an ethylene glycol solution of antimony trioxide was added instead of the ethylene glycol solution of the aluminum compound and the ethylene glycol solution of the phosphorus compound, in an amount of 0.020% by mole in terms of antimony metal relative to the acid component in the polyester. A polyester film was obtained by producing a film in the same method as in Example 1 except using pellets of the resulting masterbatch polyester composition (C). The properties of the resulting film are given in Table 1.

Comparative Example 2

A masterbatch polyester composition (D) having an intrinsic viscosity of 0.58 dl/g was obtained in the same method as in Example 1 except that in the polymerization method of Example 1, an ethylene glycol solution of sodium acetate was added instead of the ethylene glycol solution of the phosphorus compound, in an amount of 0.017% by mole in terms of sodium metal relative to the acid component in the polyester. A polyester film was obtained by producing a film in the same method as in Example 1 except using pellets of the resulting masterbatch polyester composition (D). The properties of the resulting film are given in Table 1.

Comparative Example 3

A masterbatch polyester composition (E) having an intrinsic viscosity of 0.61 dl/g was obtained in the same method as in Example 1 except that in the polymerization method of Example 1, the amount of the ethylene glycol slurry of silica particles was adjusted to 0.06% by mass in terms of $SiO_2$ molecules relative to the mass of the resulting polyester composition. A polyester film was obtained by producing a film in the same method as in Example 1 except using pellets of the resulting masterbatch polyester composition (E) in an amount of 100%. The properties of the resulting film are given in Table 1.

Comparative Example 4

A masterbatch polyester composition (F) having an intrinsic viscosity of 0.58 dl/g was obtained in the same method as in Example 1 except that in the polymerization method of Example 1, the amount of the ethylene glycol slurry of silica particles was adjusted to 0.6% by mass in terms of $SiO_2$ molecules relative to the mass of the resulting polyester composition. A polyester film was obtained by producing a film by the same method as in Example 1 except that pellets of the resulting masterbatch polyester composition (F) and pellets of the polyester resin (X) free of inorganic particles were mixed and used together in a mass ratio of 1:9. The properties of the resulting film are given in Table 1.

Comparative Example 5

A masterbatch polyester composition (G) having an intrinsic viscosity of 0.58 dl/g was obtained in the same method as in Example 1 except that in the polymerization method of Example 1, the amount of the ethylene glycol slurry of silica particles was adjusted to 2.4% by mass in terms of $SiO_2$ molecules relative to the mass of the resulting polyester composition and the addition amounts of the aluminum compound and the phosphorus compounds were adjusted to 0.028% by moles and 0.050% by moles in terms of aluminum atoms and phosphorus atoms, respectively, relative to the acid component in the polyester. Next, a polyester film was obtained by producing a film by the same method as in Example 1 except that pellets of the resulting masterbatch polyester composition (G) and pellets of the polyester resin (X) free of inorganic particles were mixed together in a mass ratio of 1:39. The properties of the resulting film are given in Table 1.

TABLE 1

| | Masterbatch polyester composition | | | | | Composition for a film | Film evaluation | | |
|---|---|---|---|---|---|---|---|---|---|
| | Al (mol/%) | P (mol/%) | Sb (mol/%) | Na (mol/%) | $SiO_2$ (% by mass) | IV (dl/g) | The number of coarse particles | Coloration (Δb) | Insoluble particles | Resistance to hydrolysis |
| Example 1 | 0.021 | 0.037 | — | — | 1.2 | 0.59 | 72 | 0.9 | ○ | ○ |
| Example 2 | 0.028 | 0.050 | — | — | 1.8 | 0.58 | 97 | 1.3 | ○ | ○ |
| Comparative Example 1 | — | — | 0.020 | — | 1.2 | 0.58 | 581 | 3.6 | X | X |
| Comparative Example 2 | 0.021 | — | — | 0.017 | 1.2 | 0.58 | 160 | 5.9 | Δ | Δ |
| Comparative Example 3 | 0.021 | 0.037 | — | — | 0.06 | 0.61 | 155 | 1.2 | Δ | ○ |
| Comparative Example 4 | 0.021 | 0.037 | — | — | 0.6 | 0.58 | 145 | 1.0 | Δ | Δ |
| Comparative Example 5 | 0.028 | 0.050 | — | — | 2.4 | 0.58 | 397 | 1.5 | X | ○ |

INDUSTRIAL APPLICABILITY

The masterbatch polyester composition of the present invention contains components other than antimony compounds or germanium compounds as main components and is produced using an aluminum compound excellent in catalytic activity and the dispersibility of inorganic particles added during the production thereof is good. Therefore, a film using the masterbatch polyester of the present invention has an effect of being excellent in running property, wearing property, and optical properties. Accordingly, a film using the masterbatch polyester composition of the present invention can be used for a wide variety of applications, e.g., antistatic films, easily adhesive films, cards, dummy cans, agriculture uses, construction materials, decorative materials, wall paper, OHIP films, printing, ink jet recording, sublimation transfer recording, recording by laser beam printers, electrophotographic recording, thermal transfer recoding, printed substrate wiring, membrane switches, near-infrared absorbing films for plasma displays, transparent electroconductive films for touch panels or electroluminescence, masking films, photographic plate-making, roentgen films, photographic negative films, phase different films, polarization films, polarization film protection (TAC), protect films and/or separator films for inspection of deflection plates and retarders, photosensitive resin films, visible field magnifying films, diffusion sheets, reflection films, reflection prevention films, ultraviolet protection, and back grind tapes.

The invention claimed is:
1. A polyester composition for a film, wherein the polyester composition comprises a masterbatch polyester composition comprising 1.0 to 2.0% by mass of inorganic particles having an average particle diameter of 0.5 to 3.0 μm and a catalyst component, which is prepared using a polycondensation catalyst containing an aluminum compound and a phosphorus compound, and an inorganic particle-free polyester resin in a mass ratio of 1:15 to 35.

2. The polyester composition for a film according to claim 1, wherein the phosphorus compound has phenolic moieties in the same molecule thereof.

3. The polyester composition for a film according to claim 1, wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

4. The polyester composition for a film according to claim 2, wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

5. A masterbatch polyester composition to be used for the polyester composition for a film according to claim 1, wherein the masterbatch polyester composition comprises 1.0 to 2.0% by mass of inorganic particles having an average particle diameter of 0.5 to 3.0 μm and a catalyst component, wherein the masterbatch polyester composition is prepared using a polycondensation catalyst containing an aluminum compound and a phosphorus compound.

6. The masterbatch polyester composition according to claim 5, wherein the phosphorus compound has phenolic moieties in the same molecule thereof.

7. The masterbatch polyester composition according to claim 5, wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

8. The masterbatch polyester composition according to claim 6, wherein the inorganic particles are at least one kind of inert inorganic particles selected from among titanium dioxide, alumina, aluminosilicate, silicon dioxide, calcium oxide, calcium carbonate, barium sulfate, talc, mica, kaolinite, and zeolite.

9. A polyester film produced using the polyester composition for a film according to claim 1.

10. A polyester film produced using the polyester composition for a film according to claim 2.

11. A polyester film produced using the polyester composition for a film according to claim 3.

12. A polyester film produced using the polyester composition for a film according to claim 4.

* * * * *